July 14, 1925.
J. M. HOWE
VEHICLE
Filed May 26, 1923
1,545,833
3 Sheets-Sheet 1
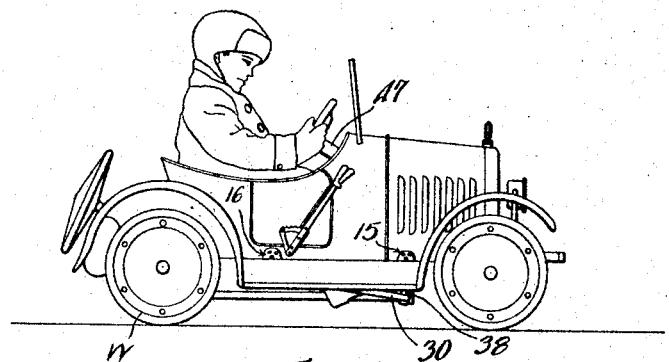
Fig.-1
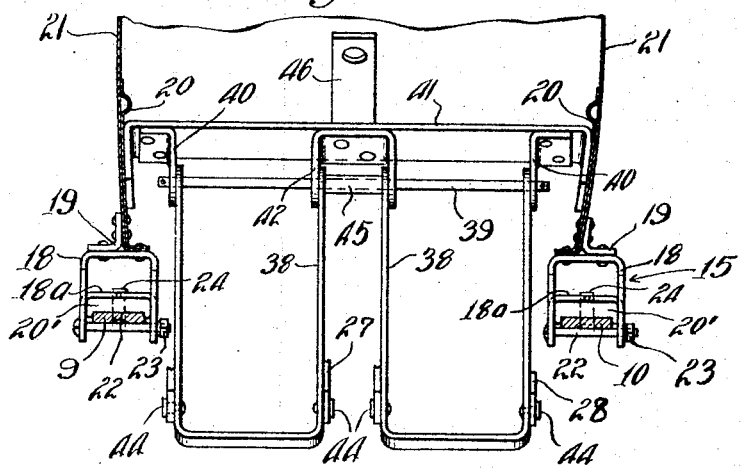
Fig.-3
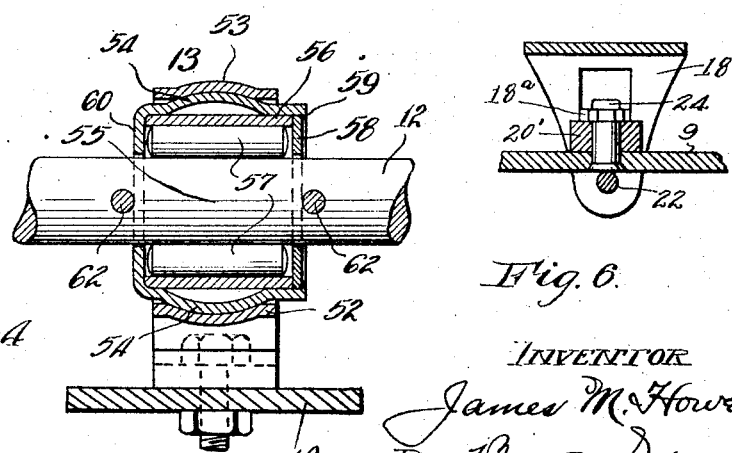
Fig.-4
Fig. 6.
INVENTOR
James M. Howe,
BY Bates & Macklin,
ATTYS.

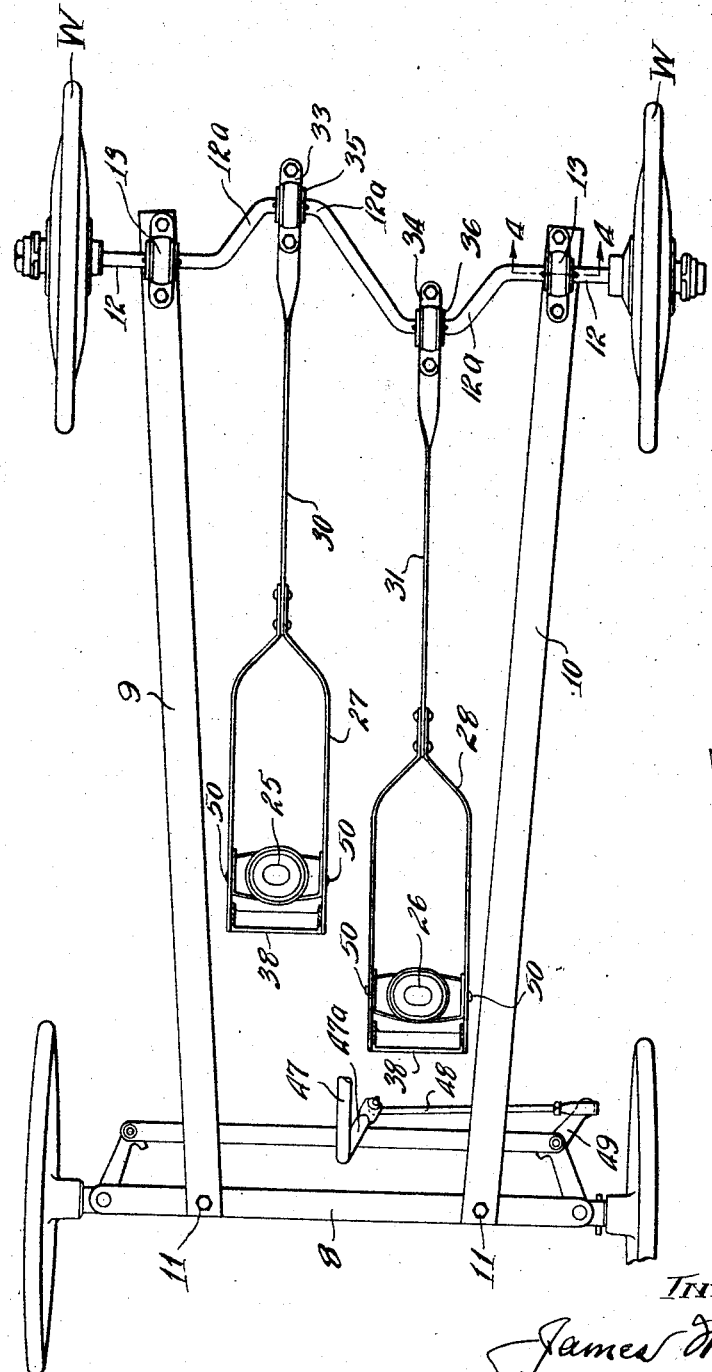

July 14, 1925.
J. M. HOWE
1,545,833
VEHICLE
Filed May 26, 1923
3 Sheets-Sheet 3
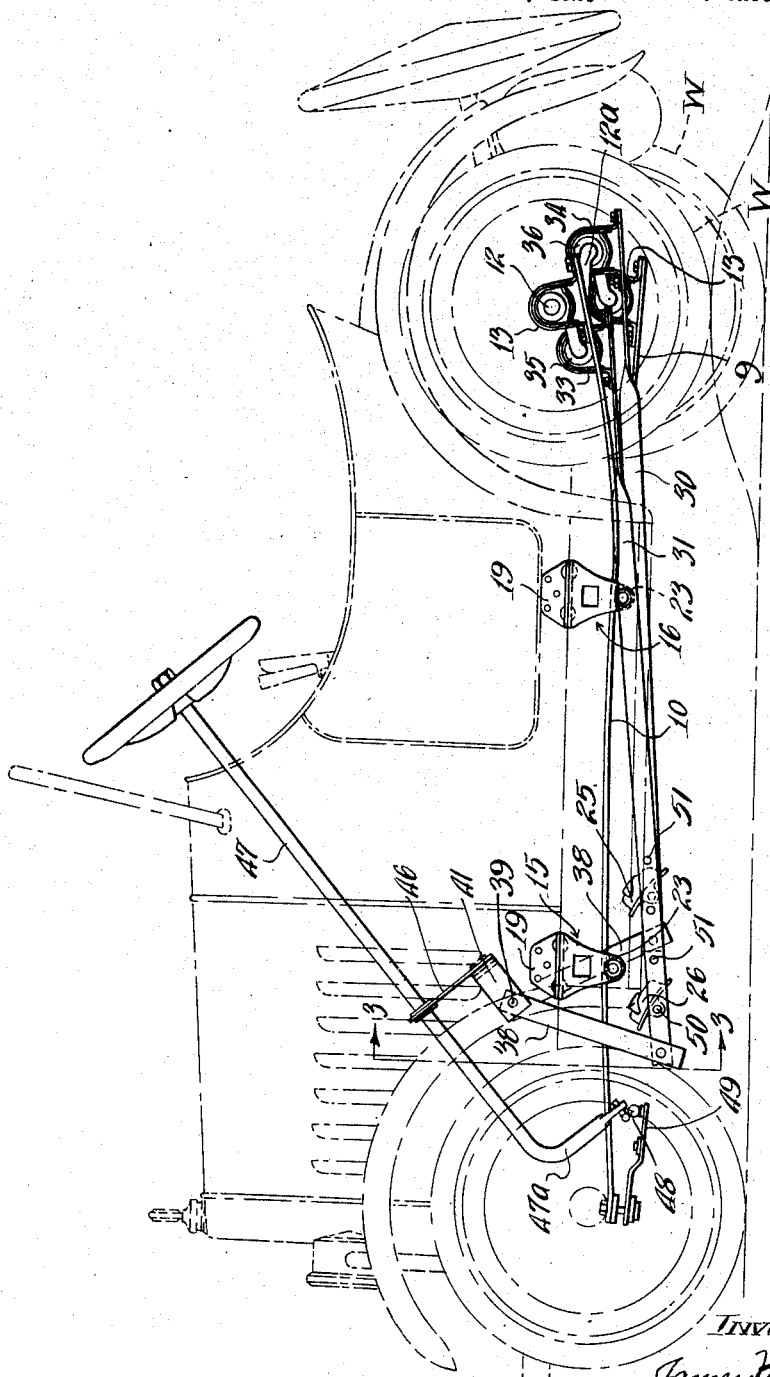

Patented July 14, 1925.

1,545,833

UNITED STATES PATENT OFFICE.

JAMES M. HOWE, OF CLEVELAND HEIGHTS, OHIO, ASSIGNOR TO THE MURRAY PRODUCTS COMPANY, OF CLEVELAND, OHIO, A CORPORATION OF MICHIGAN.

VEHICLE.

Application filed May 26, 1923. Serial No. 641,616.

*To all whom it may concern:*

Be it known that I, JAMES M. HOWE, a citizen of the United States, residing at Cleveland Heights, in the county of Cuyahoga and State of Ohio, have invented a certain new and useful Improvement in a Vehicle, of which the following is a full, clear, and exact description, reference being had to the accompanying drawings.

This invention is concerned with vehicles and more particularly with toy vehicles of the foot propelled type and has for its general object the provision of a novel body spring suspension and axle drive which may be connected to the vehicle body and to the axle while permitting the highest degree of resiliency.

Another object of my invention is the provision of a novel vehicle driving arrangement and spring suspension which obviates the use of a vehicle chassis. A further object of my invention is the provision of a novel arrangement of spring connections and driving means with a rear axle of a vehicle whereby the driving means may be operated while at all times permitting a full floating movement of the rear axle and wheels relative to the body of the vehicle. A feature of my invention is the provision of a longitudinal spring suspension for a toy vehicle and a driving arrangement therefor which may be very economically made and which will permit the wheels of the vehicle to conform to the varying contour of the roads or pavement, while affording a degree of comfort which has heretofore been thought to be commercially impractical.

Other objects of my invention will be hereinafter set forth in the following description which refers to the accompanying drawings illustrating a preferred embodiment thereof. The essential characteristics are summarized in the claims.

In the drawings, Fig. 1 is a side elevation of a toy vehicle embodying my invention; Fig. 2 is a large plan view of the axle and spring suspension of the vehicle as viewed with the body removed; Fig. 3 is a fragmentary cross sectional elevation taken through a plane which corresponds to line 3—3 as indicated in Fig. 5; Fig. 4 is a cross sectional view taken through one of the spring connections at the rear axle which corresponds to line 4—4 in Fig. 2; Fig. 5 is an enlarged side elevation of the spring suspension and driving means with the wheels and body of the vehicle as shown in dot and dash lines and illustrating the resilient characteristics of the spring and drive connections, and Fig. 6 is a cross sectional view taken substantially along the line 6—6 of Fig. 3.

In carrying out the objects of my invention, I prefer to provide a body construction of sufficient strength whereby the body may be directly connected to springs rigidly secured to the front axle of the vehicle and at the rear ends to the rear axle by connecting means which may permit a universal movement of the rear axle. I use a similar means for connecting the driving means of the vehicle with the rear axle.

In the particular embodiment illustrated, the rear axle may be an ordinary crank axle such as is used in toy vehicles. The arrangement of the driving means is such that a full floating movement of the rear axle may be obtained without complicating the mechanism comprising the driving means. I also provide attaching means connecting the body of the vehicle to the longitudinal springs whereby the maximum resiliency of the springs may be obtained throughout their length.

As shown in the drawings, the spring construction comprises longitudinal spring members 9 and 10 which may be rigidly secured at their forward ends to the front axle by any suitable means such as bolt members 11, while the other ends thereof are secured to a crank axle 12 by bearing members 13 which permit a full deflection of the spring members 9 and 10 without in any way interfering with the easy turning of the crank shaft 12. A preferred form of this bearing connection will be hereinafter described.

Bracket members 15 and 16, depending from the sides of the body, embrace the spring members 9 and 10 in such a manner that longitudinal movement of the spring members within certain limits is permitted relative to the bracket members. As shown in Fig. 3, this spring connecting means may comprise a U-shaped bracket member 18, secured to the lower edges of the side walls of the body by a bracket member 19, the body edges being reinforced by beaded sill members 20, which may be disposed on the inside of the side wall members 21, and extend the full length thereof. The legs of these U-brackets have inwardly extending portions 18ᵃ, which serve as a clamping means for resilient cushions 20′ which may be formed of rubber. The bracket portions 18ᵃ also serve as a means for limiting the longitudinal shifting movement between the spring members 9 and 10 and the body, each of the spring members being provided with upwardly extending pin members 24 rigidly attached to one of the brackets and which engage in suitable notches formed in the juxtaposed edges of the bracket portions 18ᵃ, as shown in Fig. 3.

The spring members may be maintained within the U-brackets 18 in spaced relation with the rubber cushion members 20′ by any suitable means such for instance as bolts 22 and nuts 23 which engage the bottom sides of the spring members while permitting a longitudinal sliding movement of the spring members thereupon. The pin members 24 are omitted in the rear spring bracket construction of the spring connecting means indicated at 16, Fig. 5, as I find that one pin in each spring is sufficient to maintain the body and springs in proper longitudinal relation while permitting each spring to move longitudinally with reference to one of the brackets.

The means for driving the rear axle 12 is arranged in such a manner that one wheel on the rear axle may be deflected upwardly as illustrated in Fig. 5 without resulting in any binding or undue wearing of the co-operating parts. This means may comprise foot pedal members 25 and 26 pivotally and adjustably supported in fork members 27 and 28 respectively. These members are attached to connecting rods 30 and 31 respectively which are preferably formed of flat metallic strips with the flat surfaces extending vertically as illustrated in Fig. 2 and the rearmost portions thereof twisted through approximately 90° to provide proper bearing surface for bearing bracket members 33 and 34 respectively. Bearing members 35 and 36 supported thereby may be of the same construction as the bearing members 13 connecting the longitudinal springs to the rear axle. The connecting members 30 and 31 while being of sufficient thickness to afford durability are purposely made thin enough however, whereby they may readily weave or twist slightly when the rear axle is deflected upwardly as shown in Fig. 5.

The forward ends of the fork members 27 and 28 may be pivotally connected to depending U-shaped members 38 which are pivotally mounted upon a rod member 39 supported at each end thereof by angle brackets 40 secured to a cross-member 41, while the intermediate portions thereof may be supported by a U-shaped depending bracket member 42 also secured to the cross member 41. The fork members 27 and 28 are pivotally connected to the lower extremity of the U-shaped members 38 by pivot pins 44 which secure the ends of the members 27 and 28 to the outer surfaces of the bracket members 38. The upper pivotally connected ends of the outer legs of the bracket members 38 are disposed within and abut the angle brackets 40 while the inner legs thereof are disposed within and abut the inner faces of the legs of the U-shaped bracket member 42. To properly maintain the members 38 in spaced relation, I provide a tubular member 45 which abuts the faces of the inner legs of the members 38.

The cross-bar 41 serves several purposes, namely, to support the driving pedals as described; to brace the side wall members 21 of the body; to brace the sill members 20 adjacent the position where the spring connecting means 15 are secured; and to support the steering post.

A bracket 46 secured to the cross bar 41 supports a steering post 47 which extends at an angle from the driver's position of the vehicle downwardly and terminates in an offset extension 47ᵃ to which may be connected a link member 48 having one end thereof connected to a steering member 49. The particular arrangement of the front axle construction and steering mechanism will be described and claimed in another application of mine.

The pedal members 25 and 26 may be pivotally attached to the fork members 27 and 28 respectively by removable pin members 50, there being a series of openings 51 provided in the fork members 27 and 28, whereby the pedals may be adjusted to the accommodation of the operator.

The spring connections and bearings 13 and the drive connections 34 and 35 may for convenience in production and manufacture comprise a stamped V-bracket member 53 and a bearing retaining member 52. The retaining member 54 may be bulged outwardly by a stamping operation to provide a contacting surface which may engage a complementarily formed surface on the bracket member 53. The retaining member may be secured to the bracket member by a bottom member 52 suitably formed to be conveniently secured to the legs of the bracket member and also engage the bulged portion of the retaining member whereby relative rocking movement between the springs or the propelling members and the rear axle may be permitted. Hence the contacting surfaces of the bracket members and bearing retaining member are preferably arcuately formed, with the point 55, which is the point of intersection of the center line of the rear axle member 12 and a vertical plane passing through the center of the bracket construction, comprising the radius center of the arcs. It will thus be seen that the bearing bracket members 52 and 53 and the bearing retaining member 54 are relatively movable about the center point 55.

The member 54 may retain a hardened bearing sleeve 56 within which are disposed roller bearing members 57, contacting directly with the shaft 12. A closure disc 58 may be positioned in one end of the bearing retaining member 54 by turning in one end thereof as indicated at 59 while the other roller retaining end 60 may be formed integral with the retaining member. The bearing retaining member 54, it will be seen, is in the nature of a cup with the bottom thereof perforated to permit passage of the shaft 12 therethrough while the annular side wall is bulged in the manner described to provide the aligning feature referred to. Pin members 62 may extend through suitable openings in the shaft member and serve to retain the bearing retaining members 54 in place.

The use of such a bearing construction for connecting the driving or connecting rods 30 and 31 to the offset or crank portion 12ª of the rear axle 12 and for connecting the longitudinal spring members 9 and 10 to the rear axle, affords unusual resiliency and flexibility between the body and the rear wheels W while permitting a free and easy turning movement of the axle. When, for instance, one of the rear wheels W is deflected upwardly, as illustrated in Fig. 5 by reason of an obstruction or unusual rise in the contour of the pavement, the various bearing retaining members 54 immediately adjust themselves relative to the bearing brackets 53 and no binding or retarding action and resulting friction takes place on the rear axle and the ease and facility with which a juvenile operator may propel the vehicle is greatly enhanced thereby.

It will be noted that combining the particular spring suspension set forth with a driving mechanism of the character described, results in a vehicle design having extraordinary characteristics of economy when placed in production manufacture. For instance, there is a saving in weight, there is a greater resiliency of body carriage, a high degree of drive flexibility, all of which are added features over the usual vehicle toy of this class. Such characteristics assure extreme durability while the nature of the various parts involved in the construction is such that they may be readily and economically produced and quickly assembled in the finished structure in a most practical manner.

I claim:—

1. In a vehicle of the character described, the combination of a pair of spring members, a driving axle, flexible connecting means coupling the spring members to the axle, and a propelling device connected to a crank portion of the axle by a self-adjusting bearing.

2. In a vehicle, the combination of a pair of longitudinal springs, a double cranked rear axle connected thereto, and a pair of propelling devices connected to the cranked portions of the axle by self-aligning bearings.

3. In a vehicle of the character described, the combination of a vehicle body, a driving axle, a pair of spring members, flexible connecting means coupling the spring members to the axle, and other resilient means connecting the spring members to the vehicle body.

4. In a vehicle, the combination of a body, a front axle, a rear axle, a pair of longitudinal springs connected at their front ends to the front axle, self-aligning bearing means connecting the rear ends of the springs with the rear axle, and two resilient means connecting intermediate portions of each spring with the body.

5. In a vehicle of the character described, the combination of a pair of longitudinal spring members rigidly secured to the forward axle of the vehicle, flexible connecting means securing said spring members to the rear axle of the vehicle, resilient means connecting the body of the vehicle to said spring members at positions intermediate the forward and rearward axles, propelling means therefor, and flexible connecting means between the propelling means and the rear axle.

6. In a vehicle of the character described, the combination of a pair of longitudinal spring members secured to the forward axle of the vehicle, rocker-bearing means securing said spring members to the rear axle of the vehicle, resilient means connecting the body of the vehicle to said spring members at two positions intermediate the forward and rearward axles, propelling means therefor, and flexible connecting means between the propelling means and the rear axle comprising aligning bearings permitting rotation of the axle while allowing a deflecting movement of the axle relative to the vehicle body.

7. In a vehicle of the character described, the combination of longitudinal spring members rigidly secured to the front axle of the vehicle and extending to the rear axle adjacent the sides of the body of the vehicle, means connecting the spring members to the body at intermediate points between the front and rear axles, a flexible connecting means between the spring members and the rear axle, driving means connected at one end to the body of the vehicle and at the other end to said rear axle and rocker bearing means coupling said driving means to the rear axle.

8. In a vehicle of the character described, the combination of longitudinal spring members secured to the front axle of a vehicle, means connecting the spring members to the body at intermediate points between the front and rear axles, a rocker bearing means connecting the spring members and the rear axle, driving means connected at one end to the body of the vehicle and at the other end to said rear axle and rocker bearing means coupling said driving means to crank portions of the rear axle.

9. In a vehicle of the character described, the combination of a pair of longitudinal spring members, a body, flexible means connecting the body to the longitudinal spring members, means rigidly connecting the forward ends of the spring members to the front axle of the vehicle, a flexible connecting means joining the rear axle to the rearmost portions of said spring members, pedal operated means suspended from the body of the vehicle and connected to crank portions of the rear axle and means connecting said driving means to the axle, said means being adapted to permit deflecting movements of the rear axle relative to the body of the vehicle.

10. In a vehicle of the character described, the combination of a pair of longitudinal spring members, a body, means connecting the body to the longitudinal spring members at two points intermediate the axles, means rigidly connecting the forward ends of the spring members to the front axle of the vehicle, a flexible connecting means coupling the rear axle to the spring members, pedal operated means suspended from the body of the vehicle and connected to the rear axle, and flexible means connecting said driving means to the axle, said means being adapted to permit deflecting movements of the rear axle relative to the body of the vehicle.

11. In a vehicle, the combination of a pair of longitudinal spring members having the forward ends thereof secured to the front axle of the vehicle, means connecting the rearmost portions of said springs to the rear axle of the vehicle, means connecting the body of the vehicle to said spring members intermediate of the forward and rearward axles, said means being adapted to permit a longitudinal shifting movement of the body relative to the wheels of the vehicle, a driving mechanism therefor, said driving mechanism being connected to the body of the vehicle and to a crank portion of said rear axle, and means connecting said driving means to the rear axle comprising an inner bearing mechanism and an outer bearing mechanism, the latter mechanism being adaptable to permit a deflecting or elevating movement of the axle relative to the vehicle body.

12. In a vehicle of the character described, the combination of a spring member rigidly secured to the forward axle of the vehicle, flexible connecting means for joining the rear end of the spring member to the rear axle thereof, said axle having offset crank portions, a pair of driving members, and means connecting said driving members to the crank portions of said rear axle including bracket members secured to said driving members whereby a rocking movement of said rear axle is permitted when the wheels thereof are vertically displaced relative to the vehicle body.

13. In a vehicle, the combination of a pair of longitudinal spring members having the forward ends thereof secured to the front axle of the vehicle, means connecting the rearmost portions of said springs to the rear axle of the vehicle, slidable spring engaging means, connecting the body of the vehicle to said spring members intermediate of the forward and rearward axles, said means being adapted to permit a longitudinal shifting movement of the body relative to the wheels of the vehicle, driving mechanism therefor, said driving mechanism being connected to the body of the vehicle and to said rear axle, and a flexible coupling means directly connecting said driving means to the rear axle.

14. In a vehicle of the character described, the combination of spring members rigidly secured to the forward axle of the vehicle, flexible connecting means for joining the rear end of the spring member to the rear axle thereof, driving means on the rear axle, crank members, the crank members being associated with the driving means in such manner that a floating movement of said rear axle is permitted when the wheels thereof are displaced relative to the vehicle body.

15. In a toy vehicle, the combination of a body, a pair of spring members extending longitudinally of the body and connected to the forward and rearward axle of the vehicle, flexible means connecting said spring members to the rear axle, said rear axle having crank portions, depending link members, means secured to the body for supporting said link members, pedal members and means connecting said pedal members and the crank portions of said rear axle, said connecting means being arranged to permit a floating movement of the rear axle relative to the vehicle body.

16. In a toy vehicle, the combination of U-shaped link members, means secured to the body of the vehicle pivotally supporting said link members, a pair of longitudinally extending spring members connected to the front axle of the vehicle and to the rear axle thereof, means connecting the body of the vehicle to said spring members at positions intermediate the forward and rearward axles, said rearward axle comprising a crank member and flexible means connecting said link member to the crank portion of said axle.

17. In a vehicle of the character described, the combination of a vehicle body, longitudinal spring members connecting the forward and rearward axles of the vehicle, aligning bearing members connecting the rear ends of said spring members to said rear axle, said rear axle having crank portions, pedestrially actuated means suspended from the vehicle body and connected to said crank portions and aligning bearings connecting said pedestrially actuated means to the crank portions of the rear axle.

18. In a toy vehicle, the combination of a body, longitudinal spring members, means connecting the spring members to the body intermediate the forward and rearward ends thereof, said means being arranged to permit longitudinal movement of the spring members relative to the body, a rear crank axle, pedestrially operated means therefor, bearing members connecting the rear end of said spring members to the crank axle, and other bearing members connecting said pedestrially actuated means to the crank portions of the rear axle, said means being adjustable to accommodate various sized juvenile operators.

19. In a toy vehicle, the combination of a body, a pair of spring members extending longitudinally of the body and connected to the forward and rearward axle of the vehicle, flexible bearing means connecting said spring members to the rear axle, said rear axle having crank portions, depending link members, means secured to the body supporting said link members, pedal members, flexible means connecting said pedals and the crank portions of said rear axle, said connecting means including twisted flat bars arranged to permit the floating movement of the rear axle relative to the vehicle body.

20. In a toy vehicle, the combination of a vehicle body, U-shaped link members, means secured to the body of the vehicle for pivotally supporting said link members, a pair of longitudinally extending spring members connected to the body at two separated positions intermediate the front axle of the vehicle and the rear axle thereof, a pivotal connecting means joining the spring members to the rear axle, other link members extending between the U-shaped link members and the rear axle, said rear axle comprising a crank member, flexible roller bearing means connecting said last named link members to the crank portion of said axle.

21. In a vehicle of the character described, the combination of a vehicle body, longitudinal spring members connecting the forward and rearward axles of the vehicle, aligning bearing members connecting the rear end of said spring members to said rear axle, said rear axle having crank portions, pedestrially actuated means suspended from the vehicle body and connected to said crank portions including twisted flat bar members.

22. In a toy vehicle, the combination of a body, longitudinal spring members, means connecting the spring members to the body intermediate the forward and rearward ends thereof, said means being arranged to permit longitudinal movement of the spring members relative to the body, a rear crank axle, bearing members connecting the rear end of said spring members to the crank axle, pedestrially actuated means for driving the rear axle, and other bearing members connecting said pedestrially actuated means to the crank portions of the rear axle.

23. In a vehicle, the combination of a vehicle body, a driving axle, a spring secured to the body, and means connecting the spring to the axle, said means comprising a compound bearing permitting a rotative and a floating movement of the axle relative to the spring.

24. In a vehicle, the combination of a vehicle body, a crank axle, a pedal operated bar, and means connecting the bar to the crank portion of the axle comprising a compound bearing permitting a rotative and floating movement of the axle relative to the bar.

25. In a vehicle of the character described, the combination with a body, of a front axle, a cranked rear axle, a pair of side springs extending continuously from the front axle to the rear axle, and propelling means connected with the rear axle.

26. In a vehicle of the character described, the combination with a body, of a front axle, a cranked rear axle, a pair of side springs extending continuously from the front axle to the rear axle, elastic connections between the side springs and the body, and propelling means connected with the rear axle.

In testimony whereof, I hereunto affix my signature.

JAMES M. HOWE.